March 5, 1968 YUJI TAKADA 3,372,335
TWO CHANNEL, FREQUENCY DRIFT CORRECTING, REMOTE-CONTROLLED SUPERVISORY SYSTEM
Filed Feb. 23, 1965 5 Sheets-Sheet 1

March 5, 1968 YUJI TAKADA 3,372,335

TWO CHANNEL, FREQUENCY DRIFT CORRECTING, REMOTE-CONTROLLED SUPERVISORY SYSTEM

Filed Feb. 23, 1965 5 Sheets-Sheet 3

United States Patent Office
3,372,335
Patented Mar. 5, 1968

3,372,335

TWO CHANNEL, FREQUENCY DRIFT CORRECTING, REMOTE-CONTROLLED SUPERVISORY SYSTEM

Yuji Takada, Kawasaki-shi, Japan, assignor to Fujitsu Limited, Kawasaki, Japan, a corporation of Japan Filed Feb. 23, 1965, Ser. No. 434,574
Claims priority, application Japan, Feb. 24, 1964, 39/10,038
6 Claims. (Cl. 325—49)

ABSTRACT OF THE DISCLOSURE

A transmitter station produces a first frequency and a second frequency and adds the first and second frequencies to produce a first supervisory signal comprising the sum component of the first and second frequencies. The transmitter station derives the difference between the first and second frequencies to produce a second supervisory signal comprising the difference component of the first and second frequencies. A receiver station receives the first and second supervisory signals transmitted from the transmitter station and derives the difference between the first and second supervisory signals to produce a first control signal comprising the difference of the first and second supervisory signals. The receiver station adds the first and second supervisory signals to produce a second control signal comprising the sum of the first and second supervisory signals. The first control signal is equal to twice the second frequency and the second control signal is equal to twice the first frequency.

The present invention relates to a remote-controlled supervisory system. More particularly, the invention relates to a remote-controlled supervisory system for supervising electronic equipment from a remote station by transmitted signal.

In the known type of remote-controlled supervisory system for a carrier communication system, a single tone is transmitted from the transmitter station to the receiver station, where it is filtered and its output level is detected by a level detector. The detected output level is utilized as the control signal for an automatic gain control circuit or the output level is detected by a frequency discriminator and the output of the frequency discriminator is utilized as the control signal for an automatic frequency control circuit.

The principal object of the present invention is to provide a new and improved remote-controlled supervisory system.

In order that the present invention may be readily carried into effect it will now be described with reference to the accompanying drawings, wherein.

Figure 1:
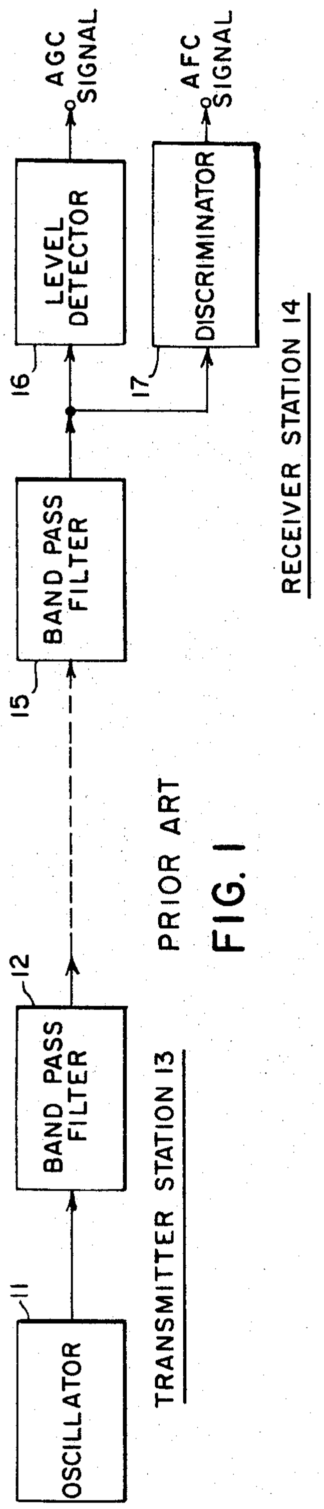
PRIOR ART FIG. 1
FIG. 1 is a block diagram of a prior art embodiment of a remote-controlled supervisory system.

In the prior art system of FIG. 1, an oscillator 11 produces a signal which is fed through a band pass filter 12. The signal is a single tone signal, which after filtering is transmitted from the transmitter station 13 by any suitable means such as, for example, wire, wireless or the like. The single tone signal from the transmitter station 13 is received by the receiver station 14, where it is filtered by a band pass filter 15 and supplied to a level detector 16. The level detector 16 detects the output level or amplitude of the received signal and utilizes such output level as an automatic gain control signal. The received signal is also detected by a frequency discriminator 17 and the output of the frequency discriminator 17 is utilized as an automatic frequency control signal.

In accordance with the present invention, instead of a single tone being transmitted, the tone is modulated. If the single tone is assumed to have a frequency of $(c)$ cycles per second, said tone is modulated by balanced modulation by a signal assumed to have a frequency of $(s)$ cycles per second. If the resultant modulation frequencies are all excluded except for the sum and difference signals, the modulated signals are $(c+s)$ and $(c-s)$. The signals $(c+s)$ and $(c-s)$ are transmitted from the transmitter station 21 to the receiver station 22 (FIG. 2) as supervisory signals.

At the receiver station 22, the received sum and difference signals $(c+s)$ and $(c-s)$ are detected by band pass filters. The outputs of the band pass filters are fed to a demodulator which produces the product of the signals.

The outputs of the band pass filters are $$A1 \cos [2\pi(c+s)t+\alpha 1]$$

and $$A2 \cos [2\pi(c-s)t+\alpha 2]$$

where A1 and A2 are the signal amplitudes, $(c+s)$ and $(c-s)$ are the signal frequencies and $\alpha 1$ and $\alpha 2$ are the phase angles of the signals.

The output of the demodulator, which is the product of the outputs of the band pass filters, is $$[A1 \cos [2\pi(c+s)t+\alpha 1]][A2 \cos [2\pi(c-s)t+\alpha 2]]$$
$$=\frac{A1A2}{2}[\cos [2\pi(c+s+c-s)t+\alpha 1+\alpha 2] + \cos [2\pi(c+s-c-s)t+\alpha 1-\alpha 2]]$$
$$=\frac{A1A2}{2}[\cos [2\pi(2c)t+\alpha 1+\alpha 2]+\cos [2\pi(2s)t+\alpha 1-\alpha 2]]$$

Accordingly, the frequency of the output of the demodulator is $(2c)$ cycles per second, which is the sum component, and $(2s)$ cycles per second, which is the difference component. The amplitude of each component is proportional to the product of the amplitudes of the sum component and the difference component.

The sum or difference component is then filtered out by filter and is utilized for level control. The sum or difference component is then the product of the amplitudes of the sum and difference components $(c+s)$ and $(c-s)$. If each of the sum and difference components has been reduced by half, therefore, the sum or difference component is reduced by a quarter, and a double variation volume is obtained. This enables the attainment of twice the sensitivity in level control with the system of the present invention over known systems.

If the supervised band or channel falls out of synchronism by $(+\alpha)$, the signal component received at the receiver station 22, which initially had a frequency of $(c+s)$, has a frequency of $(c+s+\alpha)$ and the signal component which initially had a frequency of $(c-s)$ has a frequency of $(c-s+\alpha)$. The components of the sum and difference frequencies are produced by the demodulator. The frequency of the sum component of the demodulator output then becomes $(2c+2\alpha)$ cycles per second and the frequency of the difference component of the demodulator output becomes $(2s)$ cycles per second.

If the difference component frequency of $(2s)$ cycles per second is divided in half so that it becomes $(s)$ cycles per second, this is not effected by the fall out of synchronism of the supervised band or channel and a difference component having a frequency of $(s)$ cycles per second may be transmitted from the transmitter station 21. The $(s)$ cycles per second signal may be utilized, for example, as a control signal in the event that the main oscillator falls out of synchronism in, for example, a carrier telephone system. The $(s)$ cycles per second signal may also be utilized as a clock signal in a synchronized communication system.

If the sum component, having a frequency of $(2c)$ cycles per second, is filtered out by the filter, it may be utilized as a control signal for automatic frequency control. If the sum component is supplied to a discriminator, which produces a DC output signal equivalent to a shift of frequency of $(+2\alpha)$ cycles per second, said DC output signal may be utilized as a control signal for automatic frequency control. The system of the present invention thus enables more complete automatic frequency control than prior art systems since the frequency may be detected at $(+2\alpha)$ cycles per second whereas heretofore it could be detected only at $(+\alpha)$ cycles per second.

Figure 2:
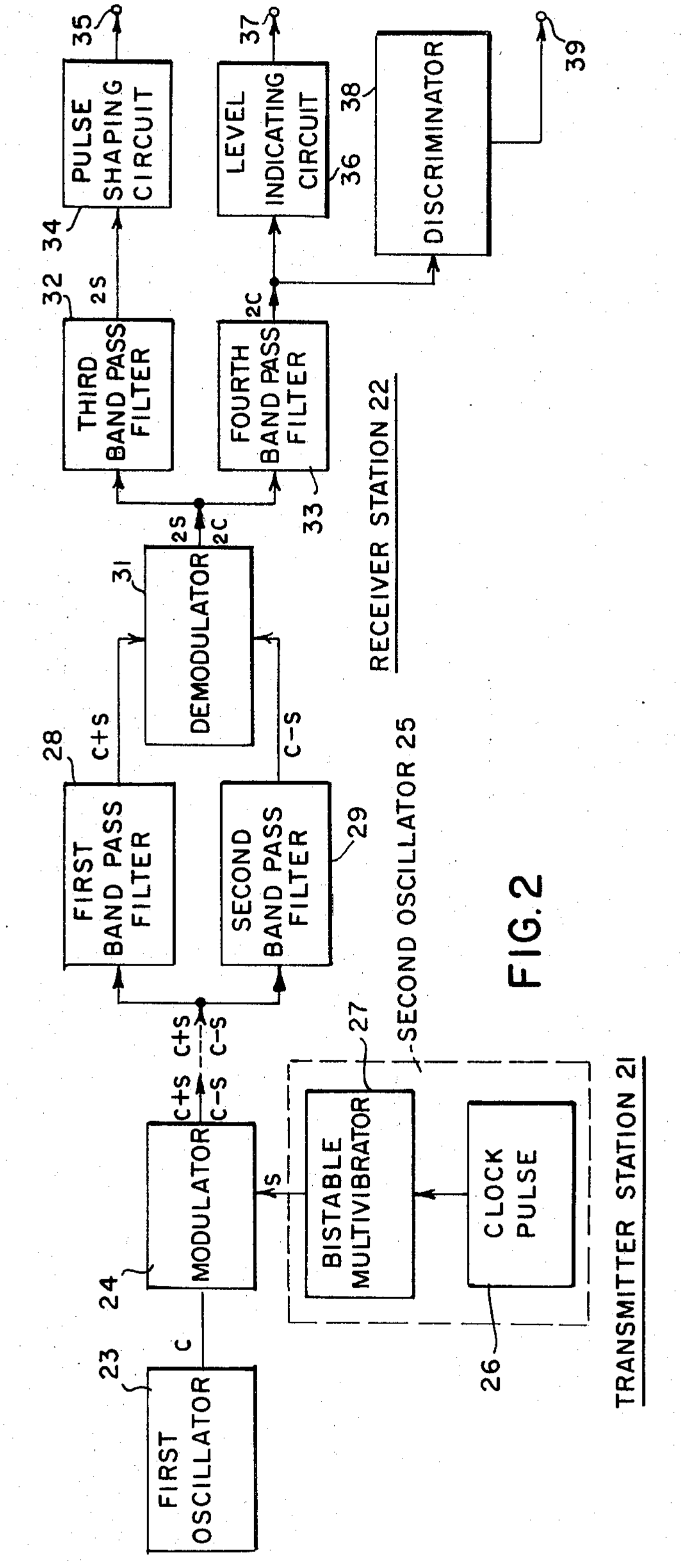
FIG. 2 is a block diagram of an embodiment of the remote-controlled supervisory system of the present invention.

In FIG. 2, which is an embodiment of the system of the present invention, a supervisory system such as, for example, a band or channel supervising system, a clock signal transmission system or the like, of a data transmission system comprises the transmitter station 21 and the receiver station 22. A first oscillator 23 produces a first signal having a frequency of $(c)$ cycles per second.

The first signal of $(c)$ cycles per second is modulated by a second signal of $(s)$ cycles per second in a modulator 24. The signal of $(s)$ cycles per second may be produced by any suitable circuit such as, for example, a second oscillator 25 which may comprise a source of clock pulses 26 and a bistable multivibrator 27. The modulator 24 provides phase reversal modulation. The phase reversal modulation inverts the phase of the first signal each time the bistable multivibrator 27 is switched in condition by a clock pulse 26. Suitable filters may be utilized where necessary in the circuit at the transmitter station 21.

The first signal of $(c)$ cycles per second and the second signal of $(s)$ cycles per second are fed to the modulator 24, which inversely modulates said first and second signals and produces modulated signals having frequencies of $(c+s)$ cycles per second and $(c-s)$ cycles per second. The modulated signals produced by the modulator 24 are transmitted from the transmitter station 21 by any suitable means such as, for example, wire or wireless or the like.

At the receiver station 22, the received modulated signals are filtered out by first and second band pass filters 28 and 29. The first band pass filter 28 provides an output signal which is the sum component and has a frequency of $(c+s)$ cycles per second. The second band pass filter 29 provides an output signal which is the difference component and has a frequency of $(c-s)$ cycles per second.

The $(c+s)$ and $c-s)$ cycles per second signals provided by the first and second band pass filters 28 and 29 are fed to a demodulator 31. The demodulator 31 provides an output signal which is the sum of the signals fed to it and an output signal which is the difference of the sibnals fed to it. The output signal of the demodulator 31 thus includes the sum of the sum and difference signals and the difference of the sum and difference signals.

The output of the demodulator 31 is filtered by third and fourth band pass filters 32 and 33. The third band pass filter 32 provides an output signal which is the difference of the sum and difference components and has a frequency of $[c+s-c-(-s)]$ or $(2s)$ cycles per second. The fourth band pass filter 33 provides an output signal which is the sum of the sum and difference components and has a frequency of $[(c+s)+(c-s)]$ or $(2c)$ cycles per second.

The $(2s)$ cycles per second signal provided by the third band pass filter 32 is fed to a pulse shaping circuit 34 which shapes the output of the third band pass filter into a square wave pulse. The square wave pulse produced by the pulse shaping circuit 34 is provided at an output terminal 35 and may be utilized as a clock pulse.

The $(2c)$ cycles per second signal provided by the fourth band pass filter 33 is fed to a level indicating circuit 36 which indicates the output level or amplitude of said signal and provides such output level at an output terminal 37 as an automatic bain control signal. The $(2c)$ cycles per second signal provided by the fourth band pass filter 33 is also fed to a frequency discriminator 38 which detects the frequency of said signal and provides such frequency at an output terminal 39 as an automatic frequency control signal.

Figure 3:
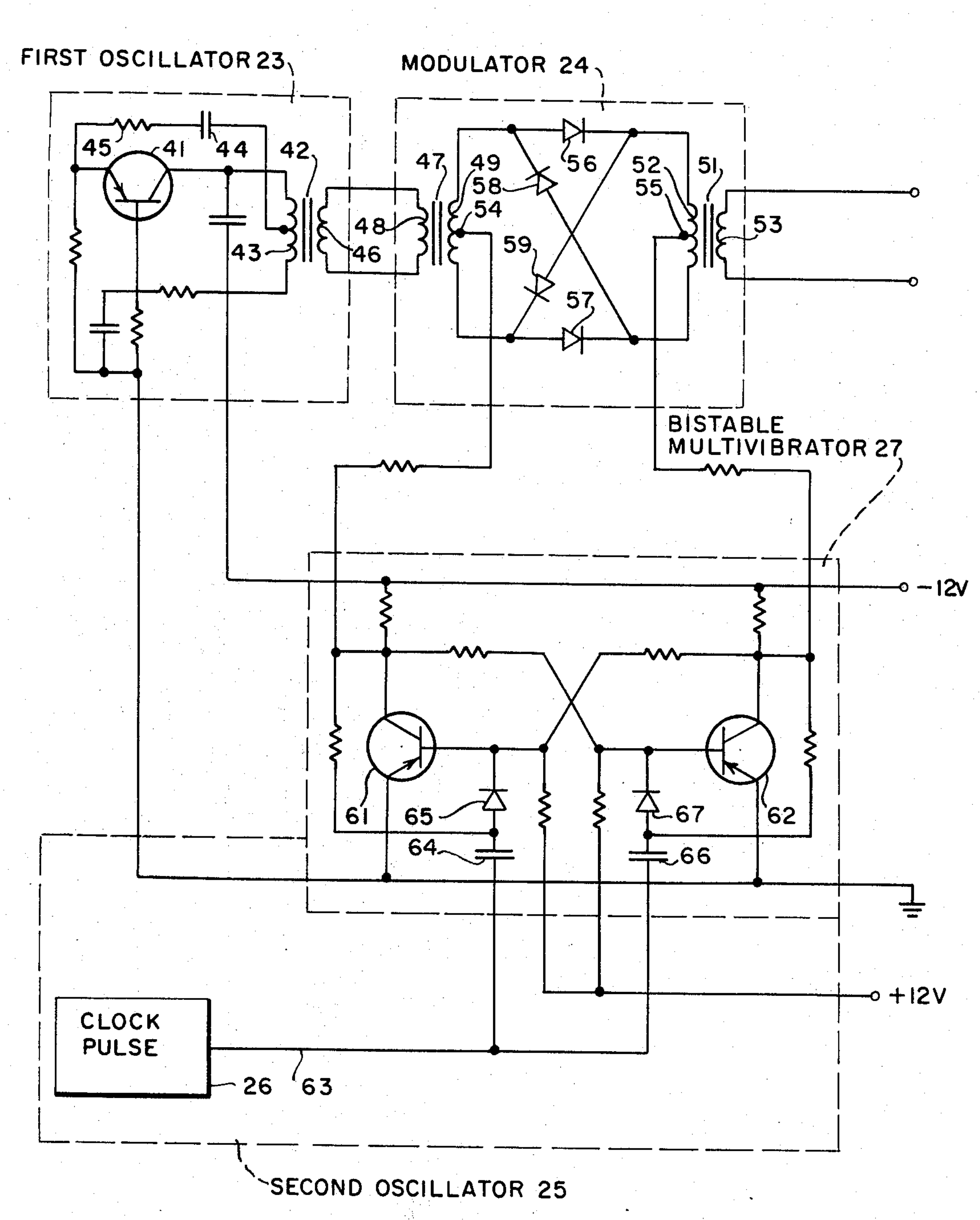
FIG. 3 is a circuit diagram of an embodiment of an oscillator, a modulator and a frequency divider which may be utilized in the system of FIG. 2.

FIG. 3 is a circuit diagram of circuits which may be utilized as the first oscillator 23, the modulator 24 and the second oscillator 25 of the system of FIG. 2. The circuit diagrams of FIG. 3 are transistor circuits. The first oscillator 23 is a collector-tuned transistor oscillator circuit utilizing a transistor 41, an output transformer 42 and a feedback circuit comprising part of the primary winding 43 of the output transformer, a feedback capacitor 44 and a feedback resistor 45. The first signal of frequency $(c)$ cycles per second is produced by the first oscillator 23 and is provided at the secondary winding 46 of the output transformer 42.

The first signal of frequency $(c)$ cycles per second is supplied to the modulator 24 via a transformer 47 having a primary winding 48 and a secondary winding 49. The first and second supervisory signals of frequency $(c+s)$ and $(c-s)$, respectively, are produced by the modulator 24 and provided by a transformer 51 having a primary winding 52 and a secondary winding 53. The second signal of frequency $(s)$ cycles per second is produced by the second oscillator 25 and is applied to the center tap 54 of the secondary winding 49 of the transformer 47 and to the center tap 55 of the primary winding 52 of the transformer 51.

When the tap 54 is positive and the tap 55 is negative, diodes 56 and 57 are biased in their conductive direction and are conductive and diodes 58 and 59 are biased in their non-conductive direction and are non-conductive. The diode 56 is connected with its anode connected to one end terminal of the secondary winding 49 and with its cathode connected to the corresponding end terminal of the primary winding 52. The diode 57 is connected with its anode connected to the other end terminal of the secondary winding 49 and with its cathode connected to the corresponding end terminal of the primary winding 52.

The diode 58 is connected with its anode connected between the cathode of the diode 57 and the primary winding 52 and with its cathode connected between the anode of the diode 56 and the secondary winding 49. The diode 59 is connected with its anode connected between the cathode of the diode 56 and the primary winding 52 and with its cathode connected between the anode of the diode 57 and the secondary winding 49. The transformers 47 and 51 thus conduct in the normal direction.

When the tap 54 is negative and the tap 55 is positive, the diodes 56 and 57 are biased in their non-conductive direction and are non-conductive and the diodes 58 and 59 are biased in their conductive direction and are conductive. The transformers 47 and 51 then conduct in an inverted manner compared to the previous case, so that when the polarities of the taps 54 and 55 are reversed the output of the modulator 24 is inverted.

The second oscillator 25 may comprise a source of clock pulses 26 and a bistable multivibrator 27 or flip flop. The flip flop 27 may comprise a transistor circuit utilizing two transistors 61 and 62. The positive clock pulse is fed to the base electrode of each of the transistors 61 and 62 via a line 63 and a capacitor 64 and a diode 65 connected between said line and the base electrode of the transistor 61 and a capacitor 66 and a diode 67 connected between said line and the base electrode of the transistor 62.

The output of the flip flop 27 is reversed in polarity each time a clock pulse is supplied to the transistors 61 and 62. The output of the flip flop 27 is the second signal of $(s)$ cycles per second frequency. The second signal modulates the first signal alternately inversely, so that the output of the modulator 24, provided at the secondary winding 53 of the transformer 51, comprises the first supervisory signal of $(c+s)$ cycles per second and the second supervisory signal of $(c-s)$ cycles per second.

Figure 4:
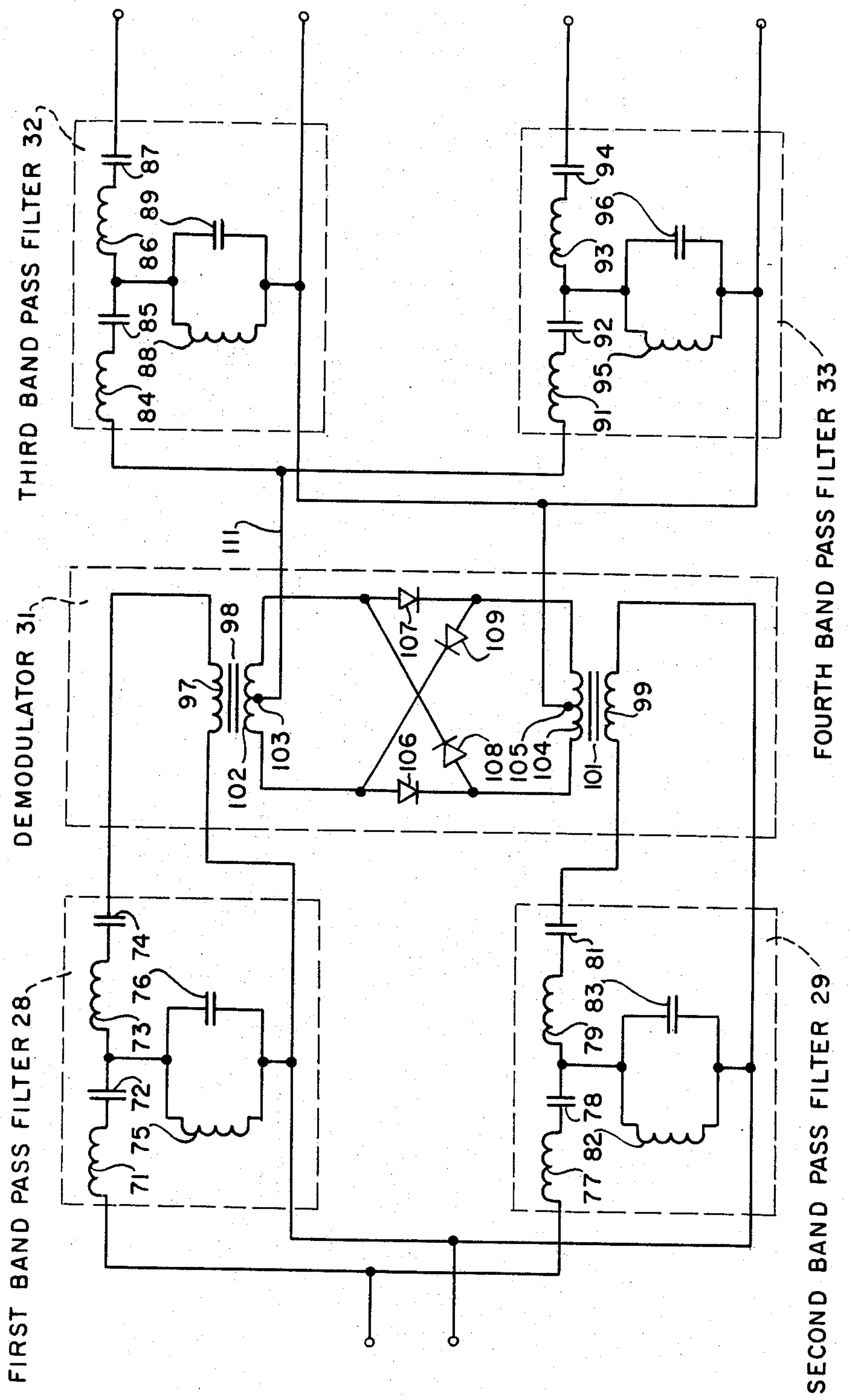
FIG. 4 is a circuit diagram of an embodiment of a first band pass filter, a second band pass filter, a demodulator, a third band pass filter and a fourth band pass filter which may be utilized in the system of FIG. 2.

FIG. 4 is a circuit diagram of circuits which may be utilized as the first band pass filter 28, the second band pass filter 29, the demodulator 31, the third band pass filter 32 and the fourth band pass filter 33 of the system of FIG. 2. Each of the first, second, third and fourth band pass filters 28, 29, 32 and 33 comprises the same components tuned to different frequencies so that each filter passes a different frequency. Thus, each of the band pass filters comprises a general T-type configuration having a series-connected sequence of an inductor, a capacitor, an inductor and a capacitor and a parallel-connected closed loop comprising an inductor and a capacitor.

The first band pass filter 28 thus comprises a series-connected sequence of an inductor 71, a capacitor 72, an inductor 73 and a capacitor 74 and a parallel-connected closed loop comprising an inductor 75 and a capacitor 76. The second band pass filter 29 comprises a series-connected sequence of an inductor 77, a capacitor 78, an inductor 79 and a capacitor 81 and a parallel-connected closed loop comprising an inductor 82 and a capacitor 83. The third band pass filter 32 comprises a series-connected sequence of an inductor 84, a capacitor 85, an inductor 86 and a capacitor 87 and a parallel-connected closed loop comprising an inductor 88 and a capacitor 89. The fourth band pass filter 33 comprises a series-connected sequence of an inductor 91, a capacitor 92, an inductor 93 and a capacitor 94 and a parallel-connected closed loop comprising an inductor 95 and a capacitor 96.

The first band pass filter 28 derives the first supervisory signal of $(c+s)$ cycles per second from the received first and second supervisory signals. The second band pass filter 29 derives the second supervisory signal of $(c-s)$ cycles per second from the received first and second supervisory signals. The first supervisory signal is supplied to the end terminals of the primary winding 97 of a transformer 98 of the demodulator 31 and the second supervisory signal is supplied to the end terminals of the primary winding 99 of a transformer 101 of said demodulator.

The transformer 98 has a secondary winding 102 having a center tap 103 thereon and the transformer 101 has a secondary winding 104 having a center tap 105 thereon. A first diode 106 is connected with its anode connected to one end terminal of the secondary winding 102 of the transformer 98 and with its cathode connected to the corresponding end terminal of the secondary winding 104 of the transformer 101. A second diode 107 is connected with its anode connected to the other end terminal of the secondary winding 102 and with its cathode connected to the corresponding end terminal of the secondary winding 104.

A third diode 108 is connected with its anode connected between the cathode of the diode 106 and the secondary winding 104 and with its cathode connected between the anode of the diode 107 and the secondary winding 102. A fourth diode 109 is connected with its anode connected between the cathode of the diode 107 and the secondary winding 104 and with its cathode connected between the anode of the diode 106 and the secondary winding 102.

The output of the demodulator 31 is provided at the taps 103 and 105 and in the leads 111 and 112 connected thereto. The transformers 98 and 101 and the diodes 106, 107, 108 and 109 function as a type of phase detector to produce the difference of the first and second supervisory signals at a frequency of $$(c+s)-(c-s)=(c+s-c+s)=(2s)$$

cycles per second in the output lead 111 and to produce the sum of the first and second supervisory signals at a frequency of $(c+s)+(c-s)=(c+s+c-s)=(2c)$ cycles per second.

The third band pass filter 32 derives the difference of the first and second supervisory signals of $(2s)$ cycles per second from the first and second supervisory signals. The fourth band pass filter 33 derives the sum of the first and second supervisory signals of $(2c)$ cycles per second from the first and second supervisory signals. The difference of the first and second supervisory signals is then utilized as a first control signal and the sum of the first and second supervisory signals is then utilized as a second control signal.

Figure 5:
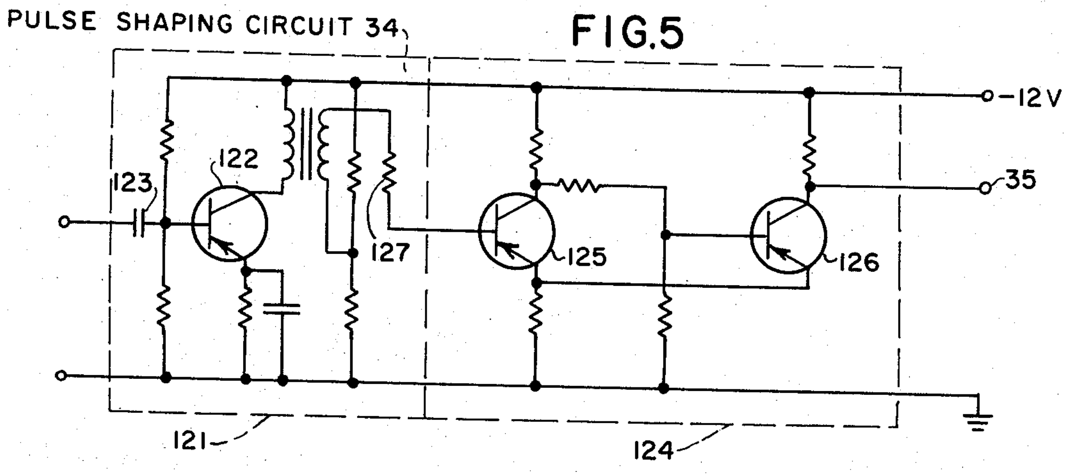
FIG. 5 is a circuit diagram of an embodient of a pulse shaping circuit which may be utilized in the system of FIG. 2.

FIG. 5 is a circuit diagram of a circuit which may be utilized as the pulse shaping circuit 34 of the system of FIG. 2. The pulse shaping circuit 34 of FIG. 5 may comprise a transistor amplifier 121 utilizing a transistor 122. The first control signal of $(2s)$ cycles per second is supplied to the base electrode of the transistor 122 via a coupling capacitor 123. The amplified output of the amplifier 121 is supplied to a bistable multivibrator or flip flop 124. The flip flop 124 may comprise a Schmitt trigger circuit having a first transistor 125 and a second transistor 126 having a common emitter coupling and a resistance coupling between the collecor electrode of the transistor 125 and the base electrode of the transistor 126.

The output of the amplifier 121 is applied to the base electrode of the transistor 125 of the trigger circuit 124 via a resistance coupling comprising a resistor 127. The trigger circuit 124 produces a substantially square wave clock pulse from the first control signal of the same frequency of $(2s)$ cycles per second. The square wave clock pulse produced at output terminal 35 may be utilized for any suitable control function, as may the first control signal provided by the third band pass filter 32.

Figure 6:
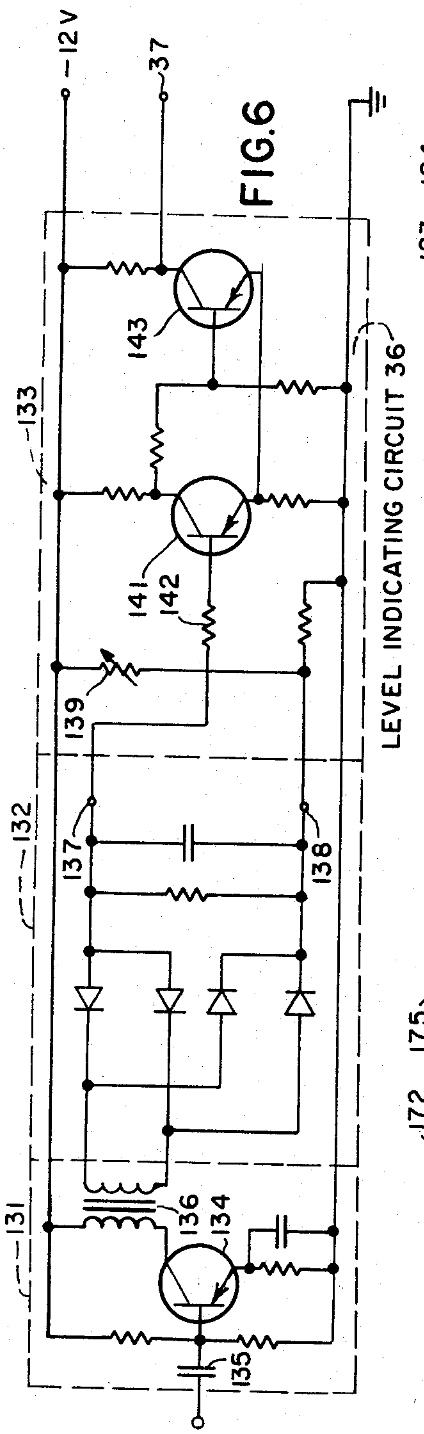
FIG. 6 is a circuit diagram of an embodiment of a level indicating circuit which may be utilized in the system of FIG. 2.

FIG. 6 is a circuit diagram of a circuit which may be utilized as the level or amplitude indicating circuit 36 of the system of FIG. 2. The amplitude indicating circuit of FIG. 6 may comprise an amplifier 131, a full-wave rectifier 132 connected to the output of the amplifier 131 and a flip flop 133 such as, for example, a Schmitt trigger, connected to the output of the rectifier 132.

The amplifier 131 comprises a transistor 134. The second control signal of ($2c$) cycles per second is supplied to the base electrode of the transistor 134 via a coupling capacitor 135. The amplified output of the amplifier 131 is supplied to the full-wave rectifier 132 via a coupling transformer 136. The rectifier 132 rectifies the amplified second control signal and produces a DC voltage corresponding to the amplitude or level of the second control signal at output terminals 137 and 138.

The level of the DC voltage at the output terminals 137 and 138 may be varied by a variable resistor 139, connected between the output terminal 138 and −12 volt line. When the DC voltage produced by the rectifier 132 has a sufficient amplitude such as, for example, −4 volts, it switches a first transistor 141 of the trigger circuit 133 to its conductive condition via a coupling resistance 142. The trigger circuit 133 includes a second transistor 143 having a common emitter coupling with the first transistor 141 and having a resistance coupling between the collector electrode of the transistor 141 and the base electrode of the transistor 143.

When the first transistor 141 of the trigger circuit 133 is in conductive condition, the second transistor 143 is in non-conductive condition and the voltage at the output terminal 37 may be, for example, −12 volts. When the DC voltage produced by the rectifier 132 approaches zero and has an amplitude of, for example, −0.5 volt, it switches the first transistor 141 to its non-conductive condition and the second transistor 143 to its conductive condition and the voltage at the output terminal 37 may become, for example, 0 volts. Thus, selection of the cut-off or switching levels of the transistors 141 and 143 enables the detection and/or indication of a drop in the level or amplitude of the second control signal.

The second control signal may be amplified and rectified in the circuits 131 and 132 and then utilized in a gain control circuit for automatic gain control.

Figure 7:
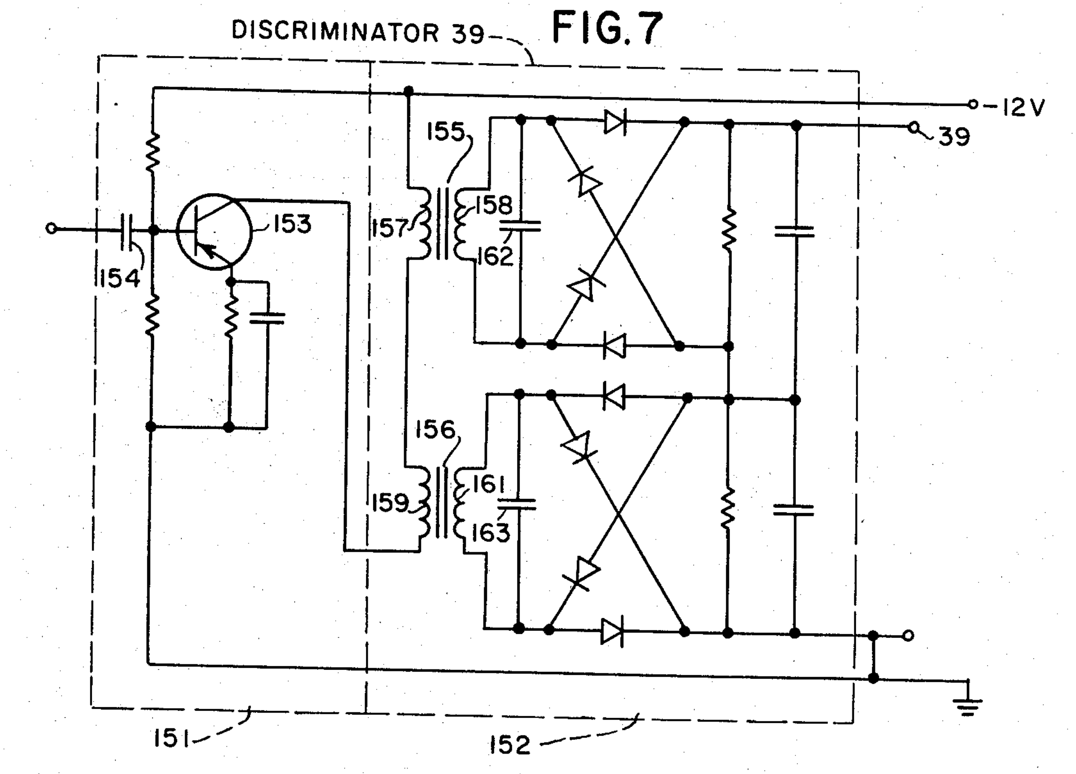
FIG. 7 is a circuit diagram of an embodiment of a discriminator which may be utilized in the system of FIG. 2.

FIG. 7 is a circuit diagram of a circuit which may be utilized as the frequency discriminator 38 of the system of FIG. 2. The frequency discriminator 38 of FIG. 7 may comprise an amplifier 151 and a double-tuned type frequency discriminator 152. The amplifier 151 comprises a transistor 153. The second control signal of ($2c$) cycles per second is supplied to the base electrode of the transistor 153 via a coupling capacitor 154. The amplified output of the amplifier 151 is supplied to the frequency discriminator 152 via coupling transformers 155 and 156.

The first transformer 155 has a primary winding 157 connected at one end terminal to the −12 volt line and a secondary winding 158. The second transformer 156 has a primary winding 159 connected at one end terminal to the other end terminal of the primary winding 157 and connected at the other end terminal to the collector electrode of the transistor 153 and a secondary winding 161.

The secondary winding 158 of the first transformer 155 is tuned to ($2c+\Delta f$) cycles per second by a capacitor 162. The secondary winding 161 of the second transformer 161 is tuned to ($2c-\Delta f$) cycles per second by a capacitor 163. Thus, if the second control signal has a frequency of ($2c+\Delta f$) cycles per second, the positive voltage produced by the secondary winding 158 of the first transformer 155 is greater in magnitude than the negative voltage produced by the secondary winding 161 of the second transformer 156, so that a positive voltage is provided at the output terminal 39. If the second control signal has a frequency of ($2c-\Delta f$) cycles per second, the negative voltage produced by the secondary winding 161 of the second transformer 156 is greater in magnitude than the positive voltage produced by the secondary winding 158 of the first transformer 155, so that a negative voltage is provided at the output terminal 39. Selection of the value of $\Delta f$ enables control of the range of operation of an automatic frequency control circuit. The second control signal may thus be utilized in a frequency control circuit for automatic frequency control.

Figure 8:
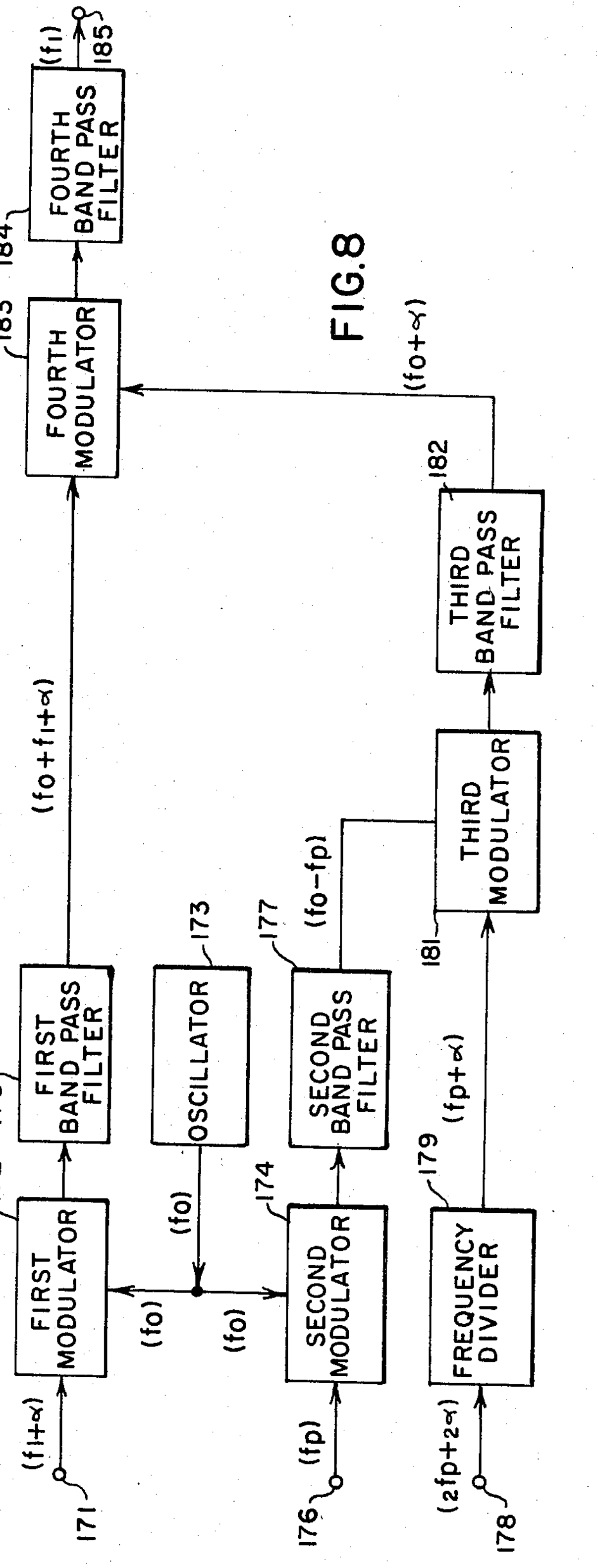
FIG. 8 is a block diagram of an embodiment of an automatic frequency control circuit which may be controlled at the receiver station 22 in the system of FIG. 2.

FIG. 8 is an automatic frequency control circuit which may be controlled at the receiver station 22 in the system of FIG. 2. A signal having a frequency of ($fl+\alpha$) cycles per second is supplied to an input terminal 171. The frequency of the signal supplied to the input terminal 171 is that which is to be controlled and is assumed to have shifted or varied by ($\alpha$) cycles per second. The signal supplied to the input terminal 171 is supplied to a first modulator 172.

An oscillator 173 produces a signal having a frequency of ($fo$) cycles per second, which signal is supplied to the first modulator 172 and to a second modulator 174. The modulator 172 modulates the signal of ($fl+\alpha$) cycles per second with the signal of ($fo$) cycles per second and supplies the modulated signal to a first band pass filter 175. The first band pass filter 175 derives the upper or positive portion of the signal fed to it to produce a signal having a frequency of ($fo+fl+\alpha$) cycles per second.

A synchronous signal having a frequency of ($fp$) cycles per second is supplied to an input terminal 176. The signal supplied to the input terminal 176 is supplied to the second modulator 174. The second modulator 174 modulates the signal of ($fp$) cycles per second with the signal of ($fo$) cycles per second from the oscillator 173 and supplies the modulated signal to a second band pass filter 177. The second band pass filter 177 derives the lower or negative portion of the signal fed to it to produce a signal having a frequency of ($fo-fp$) cycles per second.

A control signal, corresponding to the second control signal, provided by the system of the present invention, is supplied to an input terminal 178. The control signal supplied to the input terminal 178 has a frequency of ($2fp+2\alpha$) cycles per second and is supplied to a frequency divider 179. The frequency divider 179 divides the signal fed into it by two and produces an output signal having a frequency of ($fp+\alpha$) cycles per second which is supplied to a third modulator 181.

The third modulator 181 modulates the signal of ($fo-fp$) cycles per second supplied to it by the second band pass filter 177 with the signal of ($fp+\alpha$) cycles per second supplied to it by the frequency divider 179 and supplies the modulated signal to a third band pass filter 182. The third band pass filter 182 derives the upper or positive portion of the signal fed to it to produce a signal having a frequency of ($fo+\alpha$) cycles per second.

The signal supplied by the first band pass filter 175, having a frequency of ($fo+fl+\alpha$), and the signal supplied by the third band pass filter 182, having a frequency of ($fo+\alpha$), are fed to a fourth modulator 183. The fourth modulator 183 modulates the signal of ($fo+fl+\alpha$) cycles per second with the signal of ($fo+\alpha$) cycles per second and supplies the modulated signal to a fourth band pass filter 184. The fourth band pass filter 184 derives the lower or negative portion of the signal fed to it to produce a signal having a frequency of ($fl$) cycles per second at an output terminal 185. The signal provided at the output terminal 185 thus has the desired frequency of ($fl$) cycles per second, produced by the automatic frequency control circuit of FIG. 8.

If the bandwidths of the first and second band pass filters 28 and 29 of the system of FIG. 2 are narrowed, the transient times of said filters may be prolonged. This reduces the effect on the clock pulse. If, on the other hand, the bandwidths of the first, second and third band pass filters 28, 29 and 32 of the system of FIG. 2 are widened, the frequency of the clock pulses may be changed. That is, a supervisory signal may be transmitted by the transmitter station 21 and received by the receiver station 22 which varies in frequency instead of the clock pulse varying in frequency.

While the invention has been described by means of a specific example and in a specific embodiment, I do not wish to be limited thereto, for obvious modifications will occur to those skilled in the art without departing from the spirit and scope of the invention.

I claim:

1. A remote-controlled supervisory system, comprising a transmitter station comprising means for producing a first frequency and a second frequency and for adding said first and second frequencies to produce a first supervisory signal comprising the sum component of said first and second frequencies and for deriving the difference between said first and second frequencies to produce a second supervisory signal comprising the difference component of said first and second frequencies; and a receiver station comprising means for receiving said first and second supervisory signals transmitted from said transmitter station and for deriving the difference between said first and second supervisory signals to produce a first control signal comprising the difference of said first and second supervisory signals and for adding said first and second supervisory signals to produce a second control signal comprising the sum of said first and second supervisory signals, said first control signal being equal to twice said second frequency and said second control signal being equal to twice said first frequency, said receiver station means comprising means for deriving said first supervisory signal from the received first and second supervisory signals, means for deriving said second supervisory signal from the received first and second supervisory signals, means for producing the difference of said first and second supervisory signals from said means for deriving said first supervisory signal and from said means for deriving said second supervisory signal and the sum of said first and second supervisory signals from said means for deriving said first supervisory signal and from said means for deriving said second supervisory signal, means for deriving the difference of said first and second supervisory signals from the difference and sum of said first and second supervisory signals from said means for producing the difference and sum of said first and second supervisory signals and means for deriving the sum of said first and second supervisory signals from the difference and sum of said first and second supervisory signals from said means for produring the difference and sum of said first and second supervisory signals.

2. A remote-controlled supervisory system, comprising a transmitter station comprising means for producing a first frequency and a second frequency and for adding said first and second frequencies to produce a first supervisory signal comprising the sum component of said first and second frequencies and for deriving the difference between said first and second frequencies to produce a second supervisory signal comprising the difference component of said first and second frequencies; and a receiver station comprising means for receiving said first and second supervisory signals transmitted from said transmitter station and for deriving the difference between said first and second supervisory signals to produce a first control signal comprising the difference of said first and second supervisory signals and for adding said first and second supervisory signals to produce a second control signal comprising the sum of said first and second supervisory signals, said first control signal being equal to twise said second frequency and said second control signal being equal to twice said first frequency, said receiver station means comprising first band pass filter means for deriving said first supervisory signal from the received first and second supervisory signals, second band pass filter means for deriving said second supervisory signal from the received first and second supervisory signals, means for producing the difference of said first and second supervisory signals from said first and second band pass filter means and the sum of said first and second supervisory signals from said first and second band pass filter means, third band pass filter means for deriving the difference of said first and second supervisory signals from the difference and sum of said first and second supervisory signals from said means for producing the difference and sum of said first and second supervisory signals and fourth band pass filter means for deriving the sum of said first and second supervisory signals from the difference and sum of said first and second supervisory signals from said means for producing the difference and sum of said first and second supervisory signals.

3. A remote-controlled supervisory system, comprising a transmitter station comprising means for producing a first frequency and a second frequency and for adding said first and second frequencies to produce a first supervisory signal comprising the sum component of said first and second frequencies and for deriving the difference between said first and second frequencies to produce a second supervisory signal comprising the difference component of said first and second frequencies; and a receiver station comprising means for receiving said first and second supervisory signals transmitted from said transmitter station and for deriving the difference between said first and second supervisory signals to produce a first control signal comprising the difference of said first and second supervisory signals and for adding said first and second supervisory signals to produce a second control signal comprising the sum of said first and second supervisory signals, said first control signal being equal to twice said second frequency and said second control signal being equal to twice said first frequency, said receiver station means comprising first band pass filter means for deriving said first supervisory signal from the received first and second supervisory signals, second band pass filter means for deriving said second supervisory signal from the received first and second supervisory signals, means for producing the difference of said first and second supervisory signals from said first and second band pass filter means and the sum of said first and second supervisory signals from said first and second band pass filter means, third band pass filter means for deriving the difference of said first and second supervisory signals from the difference and sum of said first and second supervisory signals from said means for producing the difference and sum of said first and second supervisory signals, fourth band pass filter means for deriving the sum of said first and second supervisory signals from the difference and sum of said first and second supervisory signals from said means for producing the difference and sum of said first and second supervisory signals, pulse shaping means connected to said third band pass filter means for shaping the difference of said first and second supervisory signals from said third band pass filter means into a substantially square wave pulse, amplitude detecting means connected to said fourth band pass filter means for detecting the amplitude of the sum of said first and second supervisory signals from said fourth band pass filter means, and frequency discriminating means connected to said fourth band pass filter means for indicating the frequency of the sum of said first and second supervisory signals from said fourth band pass filter means.

4. A remote-controlled supervisory system, comprising a transmitter station comprising means for producing a first frequency and a second frequency and for adding said first and second frequencies to produce a first supervisory signal comprising the sum component of said first and second frequencies and for deriving the difference between said first and second frequencies to produce a second supervisory signal comprising the difference component of said first and second frequencies, said transmitter station means comprising means for producing a first signal having said first frequency, means for producing a second signal having said second frequency and means for modulating said first and second signals to produce said first and second supervisory signals; and a receiver station comprising means for receiving said first and second supervisory signals transmitted from said transmitter station and for deriving the difference between said first and second supervisory signals to produce a first control signal comprising the difference of said first and second supervisory signals and for adding said first and second supervisory signals to produce a second control signal comprising the sum of said first and second supervisory signals, said first control signal being equal to twice said second frequency and said second control signal being equal to twice said first frequency, said receiver station means comprising means for deriving said first supervisory signal from the received first and second supervisory signals, means for deriving said second supervisory signal from the received first and second supervisory signals, means for producing the difference of said first and second supervisory signals from said means for deriving said first supervisory signal and from said means for deriving said second supervisory signal and the sum of said first and second supervisory signals from said means for deriving said first supervisory signal and from said means for deriving said second supervisory signal, means for deriving the difference of said first and second supervisory signals from the difference and sum of said first and second supervisory signals from said means for producing the difference and sum of said first and second supervisory signals and means for deriving the sum of said first and second supervisory signals from the difference and sum of said first and second supervisory signals from said means for producing the difference and sum of said first and second supervisory signals.

5. A remote-controlled supervisory system, comprising a transmitter station comprising means for producing a first frequency and a second frequency and for adding said first and second frequencies to produce a first supervisory signal comprising the sum component of said first and second frequencies and for deriving the difference betwene said first and second frequencies to produce a second supervisory signal comprising the difference component of said first and second frequencies, said transmitter station means comprising first oscillator means for producing a first signal having said first frequency, second oscillator means for producing a second signal having said second frequency and modulator means for modulating said first and second signals to produce said first and second supervisory signals; and a receiver station comprising means for receiving said first and second supervisory signals transmitted from said transmitter station and for deriving the difference between said first and second supervisory signals to produce a first control signal comprising the difference of said first and second supervisory signals and for adding said first and second supervisory signals to produce a second control signal comprising the sum of said first and second supervisory signals, said first control signal being equal to twice said second frequency and said second control signal being equal to twice said first frequency, said receiver station means comprising first band pass filter means for deriving said first supervisory signal from the received first and second supervisory signals, second band pass filter means for deriving said second supervisory signal from the received first and second supervisory signals, demodulator means for producing the difference of said first and second supervisory signals from said first and second band pass filter means and the sum of said first and second supervisory signals from said first and second band pass filter means, third band pass filter means for deriving the difference of said first and second supervisory signals from the difference and sum of said first and second supervisory signals from said demodulator means and fourth band pass filter means for deriving the sum of said first and second supervisory signals from the difference and sum of said first and second supervisory signals from said demodulator means.

6. A remote-controlled supervisory system, comprising a transmitter station comprising means for producing a first frequency and a second frequency and for adding said first and second frequencies to produce a first supervisory signal comprising the sum component of said first and second frequencies and for deriving the difference between said first and second frequencies to produce a second supervisory signal comprising the difference component of said first and second frequencies, said transmitter station means comprising first oscillator means for producing a first signal having said first frequency, second oscillator means for producing a second signal having said second frequency and modulator means for modulating said first and second signals to produce said first and second supervisory signals; and a receiver station comprising means for receiving said first and second supervisory signals transmitted from said transmitter station and for deriving the difference between said first and second supervisory signals to produce a first control signal comprising the difference of said first and second supervisory signals and for adding said first and second supervisory signals to produce a second control signal comprising the sum of said first and second supervisory signals, said first control signal being equal to twice said second frequency and said second control signal being equal to twice said first frequency, said receiver station means comprising first band pass filter means for deriving said first supervisory signal from the received first and second supervisory signals, second band pass filter means for deriving said second supervisory signal from the received first and second supervisory signals, demodulator means for producing the difference of said first and second supervisory signals from said first and second band pass filter means and the sum of said first and second supervisory signals from said first and second band pass filter means, third band pass filter means for deriving the difference of said first and second supervisory signals from the difference and sum of said first and second supervisory signals from said demodulator means, fourth band pass filter means for deriving the sum of said first and second supervisory signals from the difference and sum of said first and second supervisory signals from said demodulator means, pulse shaping means connected to said third band pass filter means for shaping the difference of said first and second supervisory signals from said third band pass filter means into a substantially square wave pulse, amplitude detecting means connected to said fourth band pass filter means for detecting the amplitude of the sum of said first and second supervisory signals from said fourth band pass filter means, and frequency discriminating means connected to said fourth band pass filter means for indicating the frequency of the sum of said first and second supervisory signals from said fourth band pass filter means.

References Cited

UNITED STATES PATENTS

| | | | |
|---|---|---|---|
| 3,020,398 | 2/1962 | Hyde | 325—49 |
| 3,068,416 | 11/1962 | Meyer | 325—63 X |
| 3,088,070 | 4/1963 | Robel | 325—49 |
| 3,117,308 | 1/1964 | Goldberg | 178—66 X |
| 3,240,878 | 3/1966 | Dome | 179—1 |

ROBERT L. GRIFFIN, *Primary Examiner.*

DAVID G. REDINBAUGH, JOHN W. CALDWELL, *Examiners.*

B. V. SAFOURER, *Assistant Examiner.*